UNITED STATES PATENT OFFICE.

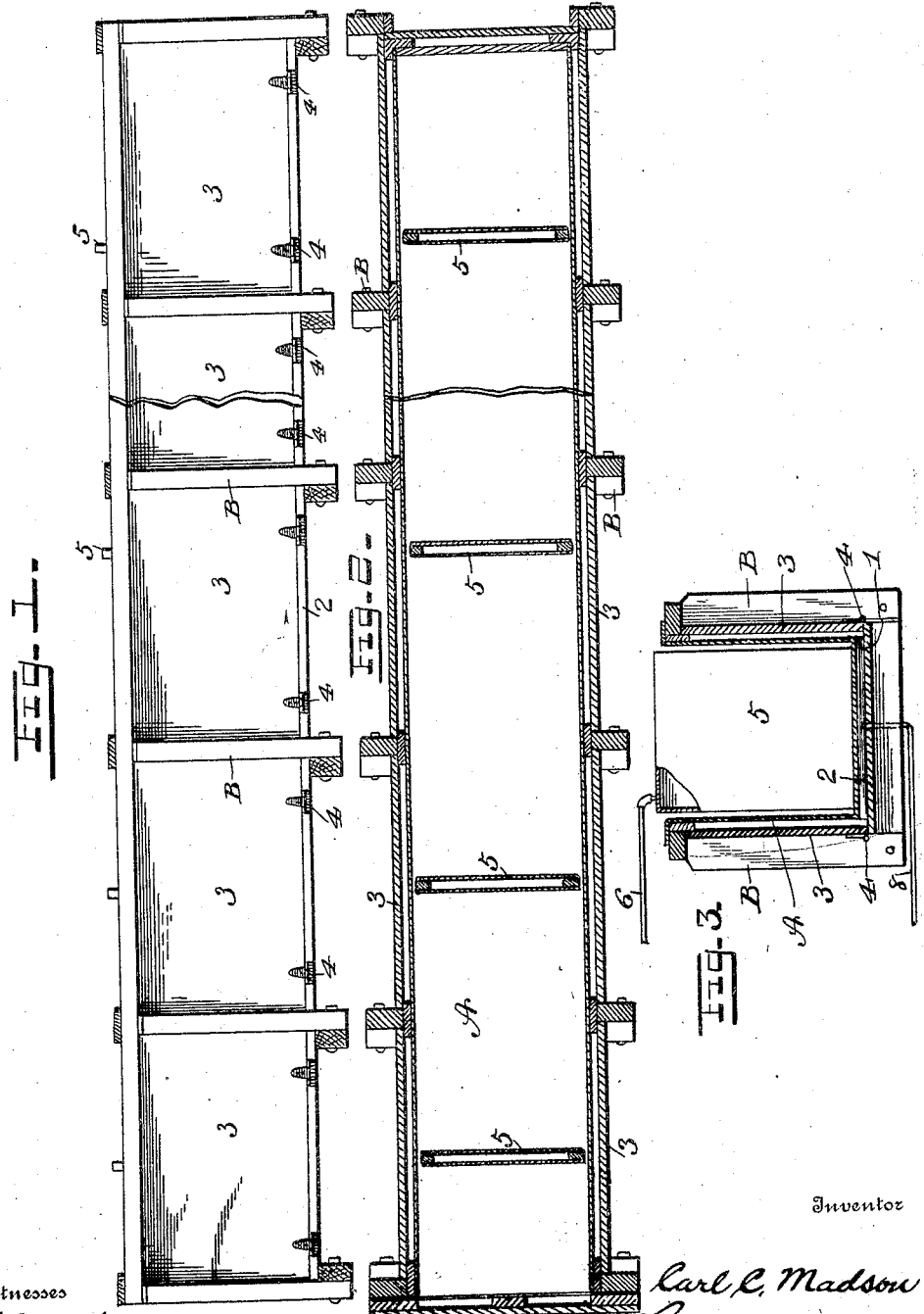

CARL C. MADSON, OF LANESBORO, MINNESOTA.

ICE-MAKING APPLIANCE.

938,259. Specification of Letters Patent. Patented Oct. 26, 1909.

Application filed February 21, 1908. Serial No. 417,146.

*To all whom it may concern:*

Be it known that I, CARL C. MADSON, a citizen of the United States, residing at Lanesboro, in the county of Fillmore and State of Minnesota, have invented certain new and useful Improvements in Ice-Making Appliances, of which the following is a specification.

My invention relates to an improvement in ice making appliances, and the object is to provide a simple and effectual mechanism for producing and harvesting the ice, and the invention consists in a metal tank set inside of an outer chamber, which latter may be opened or closed at the will of the operator, accordingly as the ice is being formed or harvested.

My invention further consists in certain novel features of construction and combinations of parts which will be hereinafter described and pointed out in the claims.

In the accompanying drawings:—Figure 1 is a view in side elevation. Fig. 2 is a horizontal section. Fig. 3 is a transverse section.

A, represents a metal tank. This is of any size and dimensions and preferably supported on the bottom on suitable cleats 1, 1, placed at intervals apart for its support, and whereby to afford air or steam space beneath the tank. The framework B, is constructed outside of the tank, consisting of 2"×4" sills and uprights as shown. A jacket or casing is supported upon the frame work which consists of a floor 2 formed at the bottom of the frame and the sides are in the form of doors 3, 3, hinged preferably at the bottom as at 4, 4. The jacket surrounds the bottom, sides, and one end of the tank, and as the tank is supported out of contact with these parts, steam can be admitted for thawing the ice in the tank. The upper edges of the sides of the tank rest upon the top of the frame-work or jacket. The object of these doors is to provide means for forming a chamber of limited depth, say about an inch around the sides of the tank, wherein steam is received when the doors are in their upright position for melting the ice from the sides of the metal tank when it is desired to harvest the ice.

The ice is formed in the tank by any of the approved methods of manufacturing ice, as my invention has to do with the loosening and harvesting of the ice more than with its formation.

As a simple means for separating the ice into cakes of suitable size, the hollow partitions 5, 5, are employed. These are located to suit the requirements as to size of the block of ice, and a steam pipe 6, 6, discharges into each partition, whereby the ice formed in contact with the partition is loosened just as at the sides where the doors are located.

A water-tight door 7 having a gasket extending over one side may be provided at one end of the casing for closing the tank which is open at this end, and through which the ice is pulled out after being frozen. Also the ice might be lifted out through the top, if desired, by any convenient mechanism for that purpose.

The steam for loosening the ice from the sides of the tank is introduced through pipe 8.

From the foregoing it will be seen that it is simply necessary to close the doors at the sides and turn on the steam in pipe 8 to loosen the ice from the sides of the freezing tank, and to turn the steam into pipes 6, 6, to loosen the ice in contact with the partitions, after which it may be removed in any convenient manner, either from the top or at one end of the freezing tank. In this way I have provided a very simple means for loosening and removing the ice, thus greatly reducing the cost and the time consumed in liberating the frozen product from the tank in which it is formed, and in which it is tightly frozen.

It is evident that more or less slight changes might be resorted to in the form and arrangement of the several parts described without departing from the spirit and scope of my invention, and hence I do not wish to limit myself to the exact construction herein set forth, but:—

Having fully described my invention, what I claim as new and desire to secure by Letters Patent, is:—

1. The combination with a jacket having a bottom, cleats upon the bottom, of a tank mounted upon the cleats forming a space between the bottom of the jacket and tank, doors hinged to the bottom adapted to be raised alongside the sides of the tank for forming the sides of the casing to form a space between the tank and sides of the casing, said space between the casing and the tank adapted to receive a thawing medium for liberating the ice in the tank.

2. The combination with a jacket having a bottom, cleats upon the bottom, of a tank mounted upon the cleats forming a space between the bottom of the jacket and tank, doors hinged to the bottom adapted to be raised alongside the sides of the tank for forming the sides of the casing to form a space between the tank and sides of the casing, said space between the casing and the tank adapted to receive a thawing medium for liberating the ice in the tank, and hollow partitions in the tank for separating the ice into suitable sized blocks, said partitions adapted to receive a thawing medium therein.

3. The combination with an ice tank having one end thereof open, of a casing surrounding the bottom, sides and one end of the tank, means for spacing the tank and casing from each other whereby a thawing medium may be introduced between the tank and casing and the side walls of the casing adapted to be opened outwardly.

In testimony whereof I affix my signature in presence of two witnesses.

CARL C. MADSON.

Witnesses:
 VINCENT KELLY,
 EDWARD E. McHUGH.